July 13, 1954  S. BOWMAN  2,683,362
OVERRIDING CLUTCH
Filed March 12, 1953
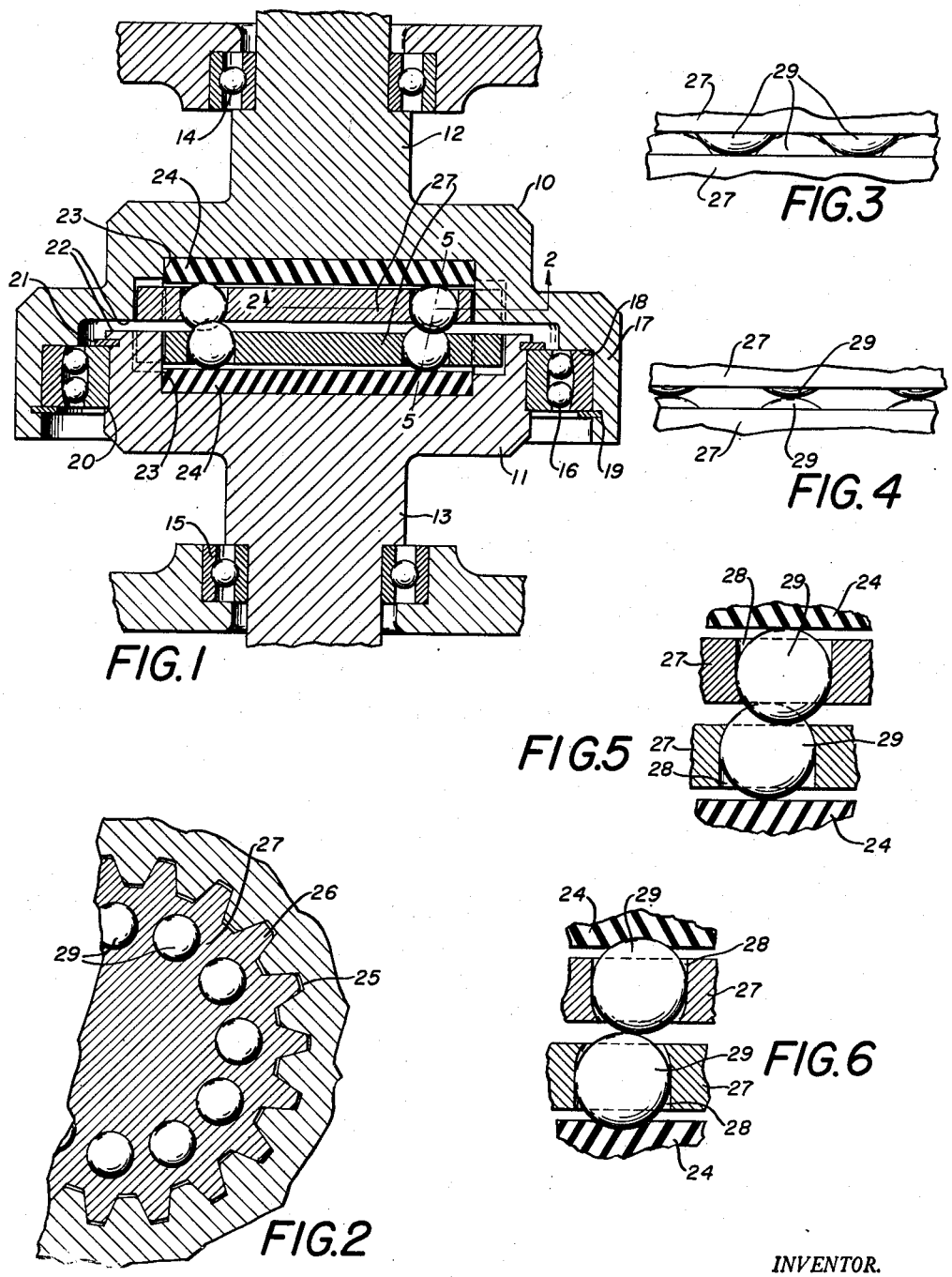
INVENTOR.
SPENCER BOWMAN
BY
ATTORNEY Patented July 13, 1954

2,683,362

UNITED STATES PATENT OFFICE 2,683,362

OVERRIDING CLUTCH

Spencer Bowman, Bay Village, Ohio, assignor to Le Roi Company, Milwaukee, Wis., a corporation of Wisconsin Application March 12, 1953, Serial No. 341,973

8 Claims. (Cl. 64—29)

This invention relates generally to clutches, but more particularly to an overriding clutch mechanism of the disc type.

One of the objects of this invention is to provide a novel clutch mechanism, so constituted as to readily override once the design torque is exceeded.

Another object of this invention is to produce a torque limiting device of the disc type, equipped with inter-locking elements readily releasable once the designed load is exceeded without tendency of overheating.

Yet another object of this invention is to arrange and dispose the inter-locking elements of such torque limiting device in a manner causing them to have a multitude of inter-engaging surfaces through which wear is distributed.

A still further object of this invention is to provide the inter-engaging elements of such a clutch with simple and efficient means for uniformly maintaining them in operative engagement until the designed load is exceeded.

These objects are accomplished by a construction free of complication, and by an arrangement of parts resulting in a compact unit which is strong, durable and efficient.

In the drawing which illustrates a preferred embodiment of the invention:

Figure 1 is a longitudinal sectional view of a clutch embodying the invention and shown in engaged or operative position.

Figure 2 is a portion of a cross sectional view taken on line 2—2 in Figure 1.

Figure 3 is an enlarged diagrammatic developed view showing the interengaging elements in operative position.

Figure 4 is a view similar to Figure 3 but showing the elements in inoperative position.

Figure 5 is an enlarged cross-sectional view taken on line 5—5 in Figure 1 showing the interengaging elements in operative position.

Figure 6 is a view similar to Figure 5 but showing the elements in inoperative position.

Referring to the drawing, 10 and 11 designate two axially aligned clutch members formed with shaft positions 12 and 13 extending in opposite directions and adequately supported in bearings 14 and 15 respectively. The two members, one of which is connected to a source of power and therefore becomes the driving member while the other is connected to the work and therefore becomes the driven member, are kept in axial alignment by a self-aligning bearing 16 mounted between the member 11 and a skirt 17 extending thereover from the member 10. Bearing 16 is axially retained in the member 10 by an annular shoulder 18 and spring clip 19; and on the member 11 by an annular shoulder 20 and spring clip 21.

The two clutch members 10 and 11 have adjacent opposed clutch faces 22 each provided with a relatively large but shallow circular flat bottom recess or cavity 23 in the bottom of which is located a disc-like resilient pad 24. Above this pad, the side wall of the recess 23 is provided with equally spaced splines 25 having fitted therein the corresponding teeth 26 of a disc 27. The inner face of the disc is slightly spaced from the pad 24, while its outer face is substantially flush with the clutch face 22. Each disc 27 is provided with a circular track of circumferentially and equally spaced open ended sockets 28 extending longitudinally through the disc, which track and disc are axially aligned with the clutch members 10 and 11. As hereinafter explained, the pitch-circle of the track of sockets in one disc is somewhat greater than in the other disc. Each socket is cup shaped, that is, formed with a rounded bottom having a hole therethrough of a diameter smaller than that of the socket. All sockets are of the same shape and size with the rounded or restricted ends of the sockets of one disc 27 facing the same ends of the sockets of the other disc.

A hardened steel clutch tooth like element in the form of a ball 29 is mounted in each socket, its diameter is substantially larger than the thickness of the discs 27, and in normal operating position it protrudes from the small or restricted end of the socket to form between the clutch faces 22 a series of interengaged protuberances extending alternately from the discs 27. In the normal operative position, each ball 29 protrudes slightly from or is substantially flush with the other end of the socket 28 and rests against the resilient pad 24. This pad, which is preferably made of a resilient material such as rubber, normally holds all of the balls of one disc against the rounded ends of their sockets for interlocking engagement with the balls of the other disc. Under certain conditions of operation hereinafter explained, the balls are moved inwardly of the discs, causing them to become depressed in their respective pad. The circumferential space between any two adjacent balls of one disc 27 is calculated to enable any ball of the other disc 27 to protrude therebetween in interlocked relationship as clearly shown in Figure 3.

In the operation of the device, it is to be understood that the pads 24 are made of a resilient composition calculated to maintain the balls in torque transmitting interlocked engagement as long as the torque remains below a predetermined maximum. In other words, different pads are used for clutch units of different designed torques. As long as the designed torque is not exceeded, the balls 29 are maintained in operative interlocked engagement as shown in Figure 3, by the pads 24 to transmit rotation from one clutch member to the other. When the designed torque is exceeded, the vector of the transmitted force at point of contact between the driving and driven balls will cause the balls to move inwardly of their discs by compressing the pads 24 and enabling the drive clutch member to override the driven member. During this override, as the drive balls pass over the driven balls as shown in Figure 4, the drive clutch member will speed up to develop its input power while the driven member will slow down or stop entirely. As the driving and driven balls are thus disengaged, the pads 24 will again shift them toward each other, causing the driving balls to reengage the next driven balls and deliver thereto a rotary impact. This sudden reengagement or impact of opposed balls causes them to again move inwardly in their discs, which inward movement is again absorbed and checked by the pads 24 for dissipating the energy created by such impacts. This overriding of the balls in effect imparts reciprocation thereto on axes offset from but parallel to the center axis of the clutch members, which reciprocation continues until the driving member is stopped or at least greatly retarded. Thereafter, when the torque is again below a predetermined maximum, the balls will remain in operative interengagement as shown in Figure 3 to transmit rotation from one to the other of the clutch members 10 and 11.

Because of the difference in the pitch-circle of the two tracks of balls, during the overriding of the clutch the balls will rotate slowly on their own center, thereby offering different points of contact between opposite balls and enabling wear and fatigue to be distributed throughout the entire surfaces of the balls.

The details of structure and arrangement of parts shown and described may be variously changed and modified without departing from the spirit and scope of the invention.

I claim:

1. In a clutch, a pair of aligned clutch members having interengaging torque transmitting balls protruding from their opposed faces, each of said balls being individually movable longitudinally of said members, and a resilient pad in each of said members behind the balls thereof normally maintaining said balls in torque transmitting interengagement but enabling them to move longitudinally inwardly from said faces to permit overriding of said clutch members during certain conditions of operation.

2. In a clutch, a pair of axially aligned clutch members having opposed parallel clutch faces, a plurality of circularly disposed circumferentially spaced balls protruding from said faces in torque transmitting interengagement, and resilient means behind said balls normally maintaining them in said torque transmitting interengagement but enabling them to move inwardly of said faces to permit overriding of one of said members with respect to the other under certain conditions of operation.

3. In a clutch, a pair of axially aligned clutch members having opposed parallel clutch faces, a plurality of circularly disposed circumferentially spaced open ended sockets in each of said faces and a ball in each of said sockets, each socket having a restricted end to retain the ball therein but to enable it to protrude therefrom beyond its clutch face with the balls of one member in interlocking driving engagement with the balls of the other member, and a resilient pad in each of said members covering the other ends of said sockets, said pads normally maintaining said balls in operative engagement but enabling them to become depressed thereinto to enable overriding of said clutch members under certain conditions of operation.

4. In a clutch, a pair of axially aligned clutch members having opposed parallel clutch faces, a circular track of circumferentially spaced open ended sockets in each of said faces one concentric with the other, a clutch tooth like element in each of said sockets protruding through one end thereof beyond its clutch face with the elements of one member in torque transmitting engagement with the elements of the other member, said elements being capable of inward movement with respect to their clutch faces to enable overriding of one clutch member relative to the other when said torque reaches a predetermined maximum, and a resilient pad in each of said members covering the other end of said sockets, said pads normally maintaining said elements in torque transmitting engagement but enabling said elements to become depressed thereinto upon their inward movement aforesaid.

5. In a clutch, a pair of axially aligned clutch members having facing clutch discs removably mounted therein against rotation relative thereto and in axial alignment therewith, a concentric track of open ended sockets through each of said discs and a ball in each of said sockets, the facing ends of the sockets of said discs being restricted to retain the balls therein but enable them to protrude therefrom alternately from said discs in torque transmitting interengagement, said balls being capable of inward movement into their sockets to enable overriding of said clutch members when said torque reaches a predetermined maximum, and a resilient pad in said members covering the other ends of said sockets, said pads normally causing said balls to protrude from the restricted ends of said sockets but enabling them to become depressed thereinto upon their inward movement aforesaid.

6. A clutch comprising a pair of axially aligned clutch members having facing clutch discs movably mounted therein against rotation relative thereto, a circular track of open ended sockets through each of said discs and a ball in each of said sockets larger than the thickness of said discs, said discs and tracks being axially aligned with said members, means within the facing ends of said sockets retaining the balls therein but enabling them to protrude therefrom alternately from said discs in torque transmitting interengagement, said balls being capable of inward movement into their sockets to enable overriding of said clutch members when said torque reaches a predetermined maximum, and resilient means between each of said discs and clutch members common to all balls thereof for normally causing them to protrude from the facing ends of said sockets but enabling them to protrude from the other ends thereof upon their inward movement aforesaid.

7. A clutch according to claim 6 in which the circular tracks of sockets are of slightly different diameters.

8. A clutch according to claim 6 in which the balls while protruding from the facing ends of the sockets are substantially flush with the other ends thereof.

References Cited in the file of this patent

UNITED STATES PATENTS

| Number | Name | Date |
|---|---|---|
| 1,840,632 | Sheldrick et al. | Jan. 12, 1932 |

FOREIGN PATENTS

| Number | Country | Date |
|---|---|---|
| 453,178 | Great Britain | 1936 |
| 701,041 | Germany | 1941 |